United States Patent
Guo et al.

(10) Patent No.: US 8,903,402 B2
(45) Date of Patent: Dec. 2, 2014

(54) METHOD, APPARATUS, AND SYSTEM FOR ACCESS CONTROL HANDOVER OF USER BETWEEN BASE STATIONS

(71) Applicant: Huawei Technologies Co., Ltd., Shenzhen (CN)

(72) Inventors: Yali Guo, Beijing (CN); Bin Jiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 13/624,794

(22) Filed: Sep. 21, 2012

(65) Prior Publication Data

US 2013/0260768 A1  Oct. 3, 2013

Related U.S. Application Data

(63) Continuation of application No. PCT/CN2011/072078, filed on Mar. 23, 2011.

(30) Foreign Application Priority Data

Mar. 23, 2010  (CN) .......................... 2010 1 0134368

(51) Int. Cl.
  *H04W 36/00*  (2009.01)
  *H04W 36/08*  (2009.01)
  *H04W 84/04*  (2009.01)

(52) U.S. Cl.
  CPC .......... *H04W 36/08* (2013.01); *H04W 36/0083* (2013.01); *H04W 36/0055* (2013.01); *H04W 84/045* (2013.01)

USPC ............ 455/438; 455/436; 455/450; 370/331

(58) Field of Classification Search
  CPC ... H04W 84/045; H04W 36/08; H04W 48/20; H04M 2203/20; H04M 2203/44
  See application file for complete search history.

(56) References Cited

U.S. PATENT DOCUMENTS

| | | | |
|---|---|---|---|
| 2005/0090259 | A1 | 4/2005 | Jain et al. |
| 2009/0047960 | A1 | 2/2009 | Gunnarsson et al. |

(Continued)

FOREIGN PATENT DOCUMENTS

| | | |
|---|---|---|
| CN | 101400160 A | 4/2009 |
| CN | 101505476 A | 8/2009 |

(Continued)

OTHER PUBLICATIONS

Search Report of Chinese Application No. 201010134368.9 mailed Jul. 24, 2012, 5 pages. (Partial Translation).

(Continued)

*Primary Examiner* — Erika A Washington
(74) *Attorney, Agent, or Firm* — Slater & Matsil, L.L.P.

(57) ABSTRACT

Embodiments of the present invention provide a method for access control handover of a user between base stations, which includes: acquiring, by one of a first base station and a second base station, a closed subscriber group identifier CSG ID supported by the other base station and CSG membership information of a user equipment UE in the first base station; and if the CSG ID acquired by the one base station is the same as a CSG ID supported by the local base station, performing, by the one base station, access control on the UE according to the acquired CSG membership information of the UE in the first base station and an access mode of the other base station.

19 Claims, 9 Drawing Sheets

(56) References Cited

U.S. PATENT DOCUMENTS

| | | | |
|---|---|---|---|
| 2010/0008293 | A1 | 1/2010 | Gupta et al. |
| 2010/0240349 | A1* | 9/2010 | Jung et al. .................. 455/414.1 |
| 2010/0278147 | A1* | 11/2010 | Horn et al. .................... 370/331 |
| 2011/0314162 | A1 | 12/2011 | Xu et al. |

FOREIGN PATENT DOCUMENTS

| | | |
|---|---|---|
| CN | 101600157 A | 12/2009 |
| CN | 101600237 A | 12/2009 |
| CN | 101686509 A | 3/2010 |
| EP | 2 490 481 A1 | 8/2012 |
| RU | 2353073 C2 | 10/2004 |
| WO | WO 2009/045007 A1 | 4/2009 |
| WO | WO 2009/099170 A1 | 8/2009 |
| WO | WO 2011/046159 A1 | 4/2011 |

OTHER PUBLICATIONS

Extended European Search Report received in Application No. 11758804.6-1854, Applicant: Huawei Technologies Co., Ltd, mailed Mar. 6, 2013, 11 pages.

Ericsson, et al., "Way forward on the usage of X2 interface for HeNB mobility enhancements," 3GPP TSG-RAN WG3 AdHoc, R3-101968, Beijing, China, Jun. 29-Jul. 1, 2010, 1 page.

Ericsson, "Usage of X2 interface for HeNB mobility enhancements," 3GPP TSG-RAN WG3 AdHoc, R3-101887, Beijing, China, Jun. 29-Jul. 1, 2010, 3 pages.

Huawei, "Consideration on HeNB-to-HeNB Mobility," 3GPP TSG-RAN WG3 AH, R3-101864, Beijing, P.R. China, Jun. 29-Jul. 1, 2012, 3 pages.

Nokia, et al., "Access control for handover procedures to LTE CSG/ hybird cells," 3GPP TSG-RAN3 Meeting #65, R3-092623, Miyazaki, Japan, Oct. 12-15, 2009, 7 pages.

Samsung, "Access control mechanism," 3GPP TSG SA WG2 Meeting #72, TD S2-092052, Hangzhou, China, Mar. 30-Apr. 3, 2009, 3 pages.

Samsung, et al., "The usage of X2 for HeNB mobility enhancment," 3GPP TSG-RAN WG3#69, R3-102144, Madrid, Spain, Aug. 23-27, 2010, 2 pages.

Samsung, et al., "Discussion on when to include CSG Membership Status in X2 Handover Request message," 3GPP TSG RAN WG3 #71 meeting, R3-110681, Taipei, Taiwai, Feb. 21-25, 2011, 2 pages.

International Search Report received in Patent Cooperation Treaty Application No. PCT/CN2011/072078, mailed Jun. 21, 2011, 4 pages.

Written Opnion of the International Searching Authority received in Patent Cooperation Treaty Application No. PCT/CN2011/072078, mailed Jun. 21, 2011, 6 pages.

"$3^{rd}$ Generation Partnership Project; Technical Specification Group Radio Access Network; UTRAN architecture for 3G Home Node B (HNB); Stage 2 (Release 9)," 3GPP TS 25.467 V9.1.0, Dec. 2009, 32 pages.

"$3^{rd}$ Generation Partnership Project; Technical Specification Group Radio Access Network; Evolved Universal Terrestrial Radio Access Network (E-UTRAN); X2 application protocol (X2AP) (Release 9)," 3GPP TS 36.423 V9.2.0, Mar. 2010, 120 pages.

Motorola, NTT DEOCOMO, Qualcomm Incorporated, Nokia Siemens Networks, Change Request, "CR Capturing HeNB Inbound Mobility Agreements," R2-100450, 3GPP TSG-RAN WG2 Meeting #68bis, Valencia Spain, Jan. 18-22, 2010, 8 pages.

Qualcomm Incorporated, Change Request, "CR Capturing HeNB Inbound Mobility Agreements," R2-100483, 3GPP TSG-RAN WG2 Meeting, #68bis, Valencia, Spain, Jan. 18-22, 2010, 9 pages.

Russian Notice of Allowance received in Application No. 2012144837/07 (072136), mailed Apr. 15, 2014, 17 pages.

Qualcomm Europe, "Access control for in-bound mobility to HeNBs," 3GPP TSG SA WG2 Meeting #70, TD S2-090129, Jan. 12-16, 2009, Scottsdale, Phoenix, USA, 4 pages.

\* cited by examiner

METHOD, APPARATUS, AND SYSTEM FOR ACCESS CONTROL HANDOVER OF USER BETWEEN BASE STATIONS

This application is a continuation of International Application Serial No. PCT/CN2011/072078, filed on Mar. 23, 2011, which claims priority to Chinese Patent Application No. 201010134368.9, filed on Mar. 23, 2010, both of which are incorporated herein by reference.

TECHNICAL FIELD

The present invention relates the field of mobile communications technologies, and in particular, to a method, an apparatus, and a system for access control handover of a user between base stations.

BACKGROUND

A home base station (Home eNodB, HeNB) is a kind of base station (eNodB), and is deployed as a dedicated resource in a place such as a home, a group, a company or a school for use. The home base station control access of a home member or a group member through a closed subscriber group (CSG). A CSG cell includes a CSG cell of a closed access mode and a CSG cell of a hybrid access mode. For the CSG cell of the closed access mode, if a user subscribes to the CSG or is added to the CSG by a CSG administrator, the user is allowed to normally reside in the CSG cell and apply for a service; for the CSG cell of a hybrid access mode, a user not belonging to the CSG cannot initiate a service in the CSG cell. Not only the user belonging to the CSG but also the user not belonging to the CSG is allowed to access. In the CSG cell of a hybrid access mode, the home base station preferentially ensures the right for the user belonging to the CSG to use resources.

In the case that an X2 interface exists between two macro base stations, a user may perform handover between the two base stations through the X2 interface. However, for the HNB, a method for performing X2 interface handover between two HNBs does not exist currently.

SUMMARY OF THE INVENTION

Embodiments of the present invention provide a method and an apparatus for access control handover of a user between base stations, ensuring a normal service of a CSG user.

In one aspect, a method for access control handover of a user between base stations is provided. One of a first base station and a second base station acquires a closed subscriber group identifier CSG ID supported by the other base station and CSG membership information of a user equipment UE in the first base station. If the CSG ID acquired by the one base station is the same as a CSG ID supported by the local base station, the one base station performs access control according to the acquired CSG membership information of the UE in the first base station and an access mode of the other base station.

In another aspect, a base station is provided. The base station is one of a first base station and a second base station. The base station includes an acquiring module that is configured to acquire a closed subscriber group identifier CSG ID supported by the other base station of the first base station and the second base station and CSG membership information of a user equipment UE in the first base station. A processing module is configured to, if the CSG ID acquired by the acquiring module is the same as a CSG ID supported by the local base station, perform access control according to the CSG membership information of the UE in the first base station acquired by the acquiring module and an access mode of the other base station.

In another aspect, a communication system includes first base station and a second base station. One of the two base stations acquires a closed subscriber group identifier CSG ID supported by the other base station and CSG identify information of a user equipment UE in the first base station. If the acquired CSG ID is the same as a CSG ID supported by the local base station, the one base station performs access control according to the acquired CSG identify information of the UE and an access mode of the other base station.

In the embodiment of the present invention, the one of the first base station and the second base station acquires the closed subscriber group identifier CSG ID supported by the other base station and the CSG identify information of the user equipment UE in the first base station; and if the CSG ID acquired by the one base station is the same as the CSG ID supported by the local base station, the one base station performs the access control according to the acquired CSG identify information of the UE and the access mode of the other base station, preventing a UE without access permission from being handed over to a CSG cell, and thereby ensuring a normal service of the UE in the CSG cell.

In the embodiment of the present invention, the second base station sends the CSG ID supported by the second base station to the first base station; the second base station receives the CSG membership information of the UE in the first base station sent by the first base station, and allocates resources to the UE according to the CSG membership information of the UE in the first base station, so as to preferentially allocate the resources to the UE belonging to a CSG cell, ensuring the power for the UE belonging to the CSG cell to preferentially use subscribed-to resources.

BRIEF DESCRIPTION OF THE DRAWINGS

To illustrate the technical solutions in the embodiments of the present invention more clearly, the accompanying drawings for describing the embodiments are introduced briefly in the following. Apparently, the accompanying drawings in the following description are only some embodiments of the present invention, and persons of ordinary skill in the art may further derive other drawings according to these accompanying drawings without creative efforts.

DETAILED DESCRIPTION OF ILLUSTRATIVE EMBODIMENTS

In order to the make the objectives, technical solutions, and advantages of the present invention more clearly, the present invention is further described in detail in the following with reference to the accompanying drawings. It is obvious that embodiments to be described are only a part rather than all of the embodiments of the present invention. All other embodiments obtained by persons of ordinary skill in the art based on the embodiments of the present invention without creative efforts shall fall within the protection scope of the present invention.

The embodiments of the present invention is applicable to not only a scenario that an X2 interface exists between two base stations, but also a scenario that a link is established between the base stations through an X2 proxy function entity.

A CSG cell includes a closed access mode and a hybrid access mode. For the closed access mode, when a user is handed over from a current CSG cell to a CSG cell of the closed access mode through an X2 interface, if access control is not performed on a UE, a UE without access permission may be handed over to the CSG cell, so that the UE without the access permission illegally uses network resources. For the hybrid access mode, when the user is handed over from the current CSG cell to a CSG cell of the hybrid access mode through the X2 interface, if access control is not performed on the UE, the CSG cell cannot distinguish a UE identity, so that the power for a UE belonging to the CSG cell to preferentially use CSG cell resources cannot be ensured.

Based on the foregoing analysis, the embodiments of the present invention are described by taking two base stations as an example, but the method includes, but is not limited to, access control handover between the two base station, which is not described here again.

Figure 1:
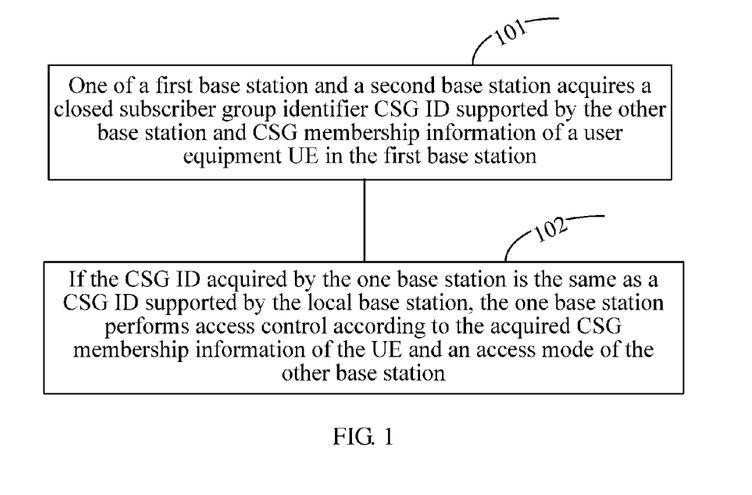
FIG. 1 is a schematic flowchart of an embodiment of a method for access control handover of a user between base stations.

FIG. 1 is a schematic flowchart of an embodiment of a method for access control handover of a user between base stations. The embodiment includes the following.

101: One of a first base station and a second base station acquires a closed subscriber group identifier CSG ID supported by the other base station and CSG membership information of a user equipment UE in the first base station.

102: If the CSG ID acquired by the one base station is the same as a CSG ID supported by the local base station, the one base station performs access control according to the acquired CSG membership information of the UE and an access mode of the other base station.

In the embodiment of the present invention, one of the first base station and the second base station acquires the closed subscriber group identifier CSG ID supported by the other base station and the CSG membership information of the user equipment UE in the first base station; and if the CSG ID acquired by the one base station is the same as the CSG ID supported by the local base station, the one base station performs the access control according to the acquired CSG membership information of the UE and the access mode of the other base station, preventing a UE without access permission from being handed over to a CSG cell, and thereby ensuring a normal service of the UE in the CSG cell. For a CSG cell of a hybrid access mode, the second base station determines whether a UE belongs to the CSG cell by performing CSG message interaction with a neighboring base station through an X2 interface, so as to preferentially allocate resources to the UE belonging to the CSG cell, ensuring the power for the UE belonging to the CSG cell to preferentially use subscribed-to resources. The embodiment of the present invention is applicable to not only a scenario that the X2 interface exists between two base stations, but also a scenario that an X1 interface exists between two base stations and a scenario that a link is established through an X2 proxy function entity.

Figure 2A:
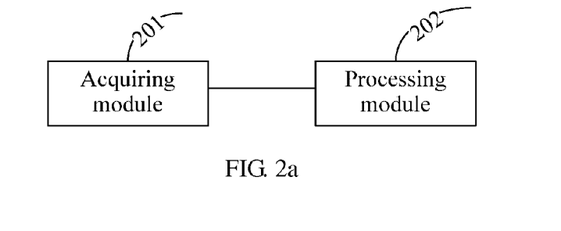
FIG. 2a is a schematic structure diagram of an embodiment of a base station.

FIG. 2a is a schematic structure diagram of a base station according to an embodiment of the present invention. The base station is one of a first base station and a second base station and includes an acquiring module 201 that is configured to acquire a closed subscriber group identifier CSG ID supported by the other base station of the first base station and the second base station and CSG membership information of a user equipment UE in the first base station. A processing module 202 is configured to, if the CSG ID acquired by the acquiring module is the same as a CSG ID supported by the local base station, perform access control according to the CSG membership information of the UE in the first base station acquired by the acquiring module and an access mode of the other base station.

In the embodiment of the present invention, one of the first base station and the second base station acquires the closed subscriber group identifier CSG ID supported by the other base station and the CSG membership information of the user equipment UE in the first base station; and if the CSG ID acquired by the one base station is the same as the CSG ID supported by the local base station, the one base station performs the access control according to the acquired CSG membership information of the UE and the access mode of the other base station, preventing a UE without access permission from being handed over to a CSG cell, and thereby ensuring a normal service of the UE in the CSG cell. For a CSG cell of a hybrid access mode, the second base station determines whether a UE belongs to the CSG cell by performing CSG message interaction with a neighboring base station through an X2 interface, so as to preferentially allocate resources to the UE belonging to the CSG cell, ensuring the power for the UE belonging to the CSG cell to preferentially use subscribed-to resources. The embodiment of the present invention is applicable to not only a scenario that the X2 interface exists between two base stations, but also a scenario that an X1 interface exists between two base stations and a scenario that a link is established through an X2 proxy function entity.

The acquiring module is specifically configured for the second base station to acquire the CSG ID supported by the first base station and the CSG membership information of the UE in the first base station that are carried in a handover request message sent by the first base station; or specifically configured for the second base station to acquire the CSG ID supported by the first base station and carried in an X2 interface establishment request or an X2 interface establishment response message sent by the first base station, and configured for the second base station to acquire the CSG membership information of the UE in the first base station carried in a handover request message sent by first base station; or specifically configured for the first base station to acquire the CSG ID supported by the second base station and carried in the X2 interface establishment request or X2 interface establishment response message and sent by the second base station, and configured for the first base station to acquire the CSG membership information of the UE in the local base station from the local base station.

Further, the acquiring module is further configured for the first base station to acquire the access mode of the second base station carried in the X2 interface establishment request or X2 interface establishment response message and sent by the second base station.

Figure 2B:
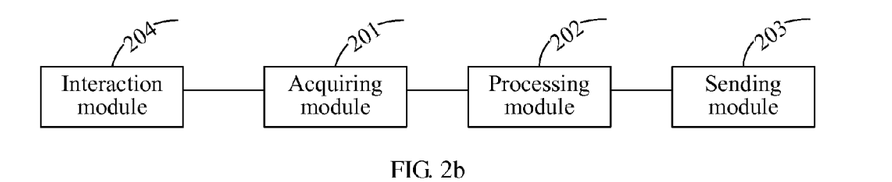
FIG. 2b is another schematic structure diagram of an embodiment of a base station.

Further, as shown in FIG. 2b, the base station further includes a sending module 203 that is configured for the first base station to send the CSG membership information of the UE in the first base station to the second base station if the processing module performs the access control successfully. An interaction module 204 is configured for the second base station and the first base station to perform base station information interaction through an X2 proxy function entity before the acquiring module acquires the closed subscriber group identifier CSG ID supported by the other base station and the CSG membership information of the user equipment UE in the first base station, so that the first base station and the second base station communicate with each other through the X2 proxy function entity. The base station information at least includes an interface relationship between the base station and the X2 proxy function entity.

Figure 3A:
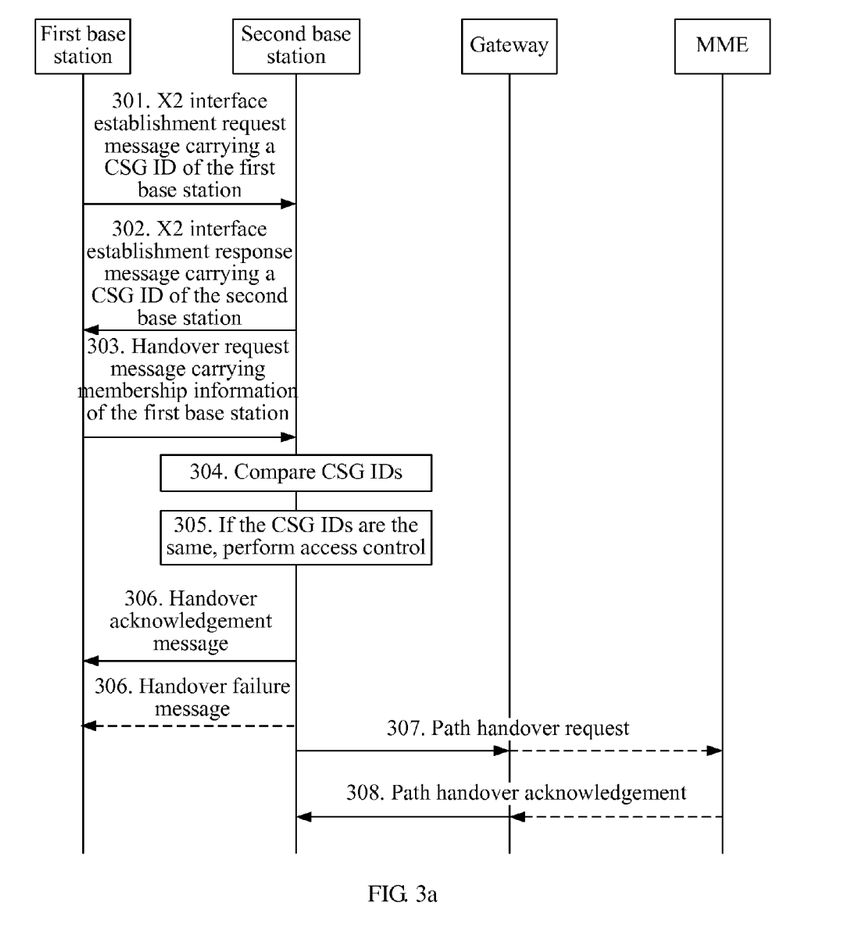
FIG. 3a is a schematic flowchart of another embodiment of a method for access control handover of a user between base stations.

FIG. 3a is a schematic flowchart of another embodiment of a method for access control handover of a user between base stations. The following paragraphs provide details of this method.

301: A first base station sends an X2 interface establishment request message to a second base station, where the message carries CSG ID information supported by the first base station.

302: The second base station sends an X2 interface establishment response message to the first base station, where the message carries CSG ID information supported by the second base station.

Optionally, the second base station may check whether the received CSG ID is the same as a CSG ID broadcast by the second base station; if the received CSG ID is not the same as a CSG ID broadcast by the second base station, the second base station refuses to establish an X2 interface with the first base station.

The X2 interface establishment request message in steps 301 and 302 may also be an X2 interface modification message.

The CSG ID information in steps 301 and 302 may be a cell access mode or a combination of a CSG ID and the cell access mode.

In steps 301 and 302, the second base station may also send the X2 interface establishment request message to the first base station, and the first base station may also send a handover establishment response message to the second base station.

303: The first base station sends a handover request message to the second base station through the X2 interface, where the handover request message carries CSG membership information of the UE in the first base station.

The membership information is used to identify whether the UE belongs to the CSG.

304: The second base station compares whether a CSG ID of the second base station is the same as a CSG ID of the first base station.

Optionally, the first base station may also compare whether the CSG ID supported by the first base station is the same as the CSG ID of the second base station received in the X2 interface message.

305a: If the CSG ID supported by the second base station is the same as the CSG ID supported by the first base station, carry the membership information of the UE in the first base station in a handover request, and the second base station determines that the CSG membership information of the UE in the first base station acquired from the first base station is continuously valid, performs access control according to the CSG membership information of the UE in the first base station and an access mode of the second base station, and performs step 306.

If the second base station is in a closed CSG mode and the CSG membership information of the UE in the first base station received by the second base station is that the UE belongs to the CSG cell, the handover request of the UE is accepted.

If the second base station is in the closed CSG mode and the CSG membership information of the UE in the first base station received by the second base station is that the UE does not belong to the CSG cell, the handover request of the UE is refused.

If the second base station is in a hybrid CSG mode, the second base station accepts the handover request of the UE, and allocates resources to the UE according to the received CSG membership information.

306: If access is successful, the second base station sends a handover acknowledgement message to the first base station and performs step 307. If the access control fails, a handover failure message is returned and the procedure ends.

307: After the UE accesses the second base station successfully, the second base station sends a path handover request to an MME.

308: The MME returns a path handover acknowledgement message to the second base station.

In step 306, for a handover in the same home base station gateway (Home EnodeB Gateway, HeNB GW), the HeNB GW may terminate the path handover message, and does not need to forward a path handover request message to the MME again. That is, in step 307, the HeNB GW returns the path handover acknowledgement message to the second base station.

In the case that the X2 interface exists between the two base stations, the UE may perform handover between the two base stations through the X2 interface. In a handover preparation stage, the access control and resource allocation are performed, but the second base station cannot obtain a list of CSG cells that the UE is allowed to access from a subscription database, so that a UE without access permission is handed over to the CSG cell and illegally uses network resources. For a CSG cell of a hybrid access mode, the second base station cannot preferentially allocate resources to the UE belonging to the CSG cell, influencing a normal service of the UE in the CSG cell. In the embodiment of the present invention, the base stations establish a connection through the X2 interface and perform CSG membership information interaction, preventing the UE without the access permission from being handed over to the CSG cell, and thereby ensuring the normal service of the UE in the CSG cell. For the CSG cell of the hybrid access mode, the second base station determines whether a UE belongs to the CSG cell by performing CSG message interaction with a neighboring base station through the X2 interface, so as to preferentially allocate resources to the UE belonging to the CSG cell, ensuring the power for the UE belonging to the CSG cell to preferentially use subscribed-to resources.

Figure 3B:
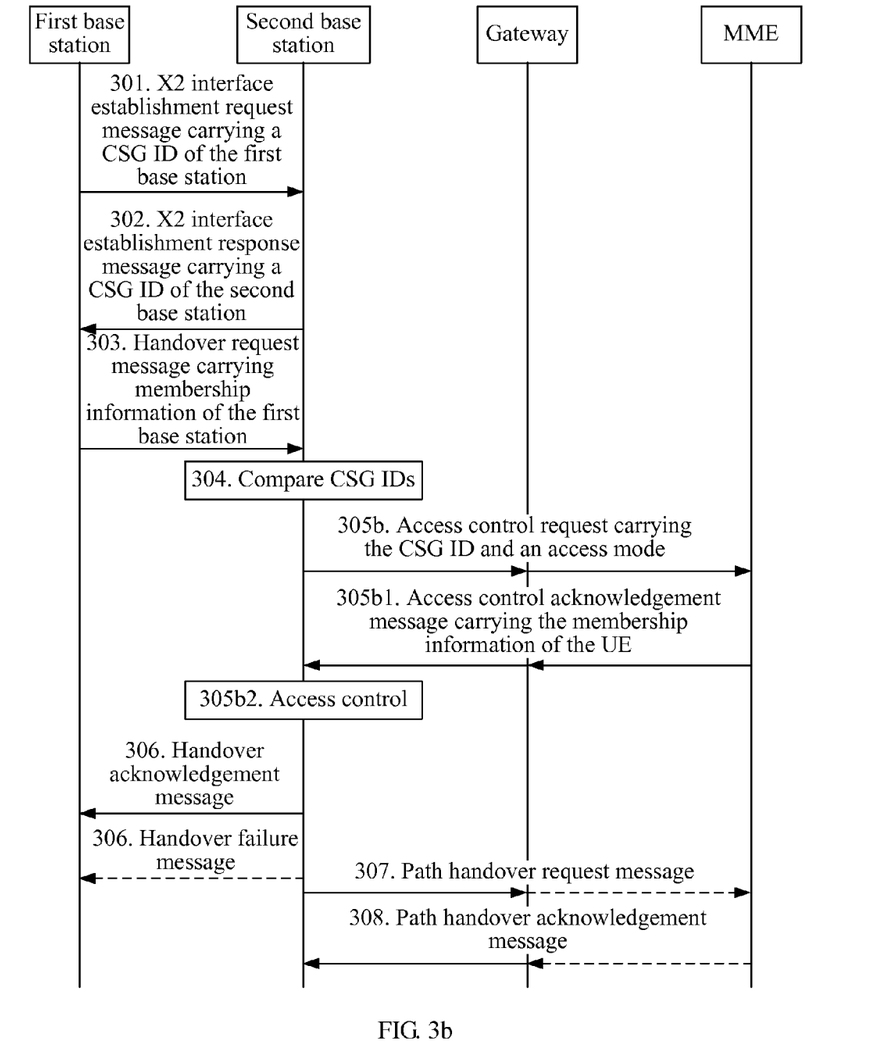
FIG. 3b is a schematic flowchart of another embodiment of a method for access control handover of a user between base stations.

FIG. 3b is a schematic flowchart of another embodiment of a method for access control handover of a user between base stations. This embodiment is approximately similar to the embodiment shown in FIG. 3a. The difference lies in the following steps.

305b: If the CSG IDs supported by the second base station and the first base station are different, the second base station sends an access control request message to the MME through the HeNB GW, where the message carries the CSG ID and an access mode of the second base station.

305b1: The MME sends an access control result to the second base station through the HeNB GW, where the message may carry the CSG membership information of the UE in the second base station.

305b2: If the second base station receives an access control acknowledgement message sent by the MME, the second base station considers that the access control is successful, and allocates resources to a user according to the CSG membership information received from the MME. If the resources are allowable, the second base station sends a handover acknowledgement message to the first base station and performs step 306. If the second base station receives an access control refusal message sent by the MME, the second base station sends a handover failure message to the first base station, and the procedure ends.

In the embodiment of the present invention, if the CSG IDs supported by the second base station and the first base station are different, the second base station sends the access control request message to the MME through the HeNB GW, where the message carries the CSG ID and the access mode of the second base station. If the second base station receives the access control acknowledgement message sent by the MME, the second base station sends an access success message to the first base station, preventing the UE without the access permission from being handed over to the CSG cell, thereby ensuring a normal service of the UE in the CSG cell, and ensuring the power for the UE belonging to the CSG cell to preferentially use subscribed-to resources.

Figure 4:
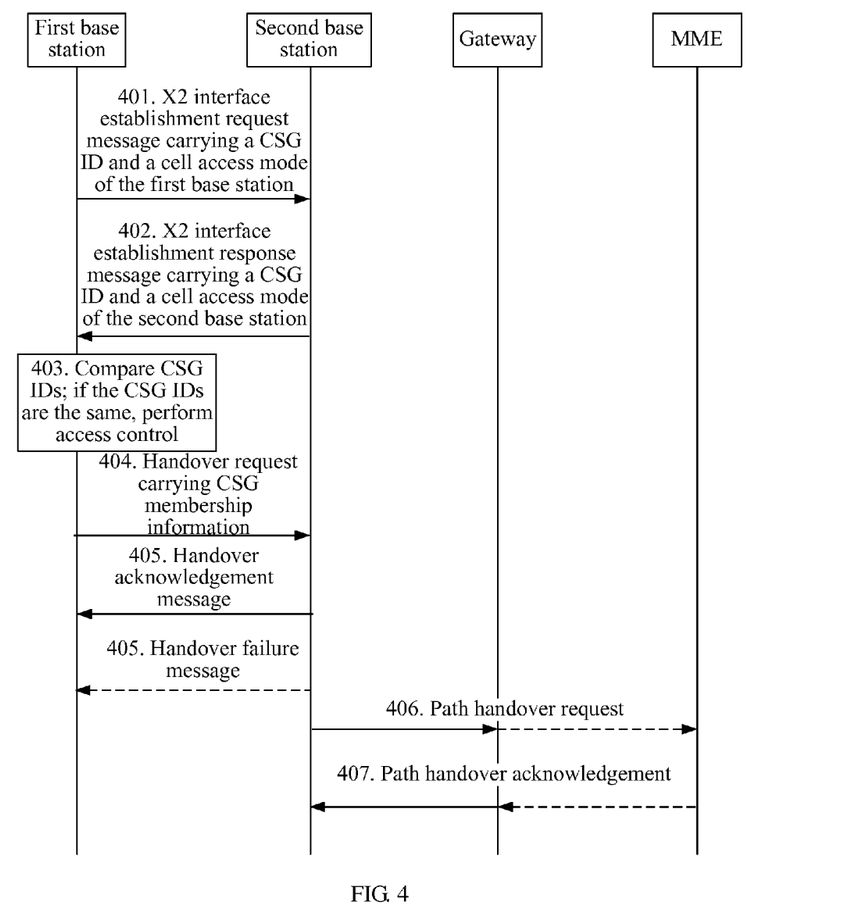
FIG. 4 is a schematic flowchart of another embodiment of a method for access control handover of a user between base stations.

FIG. 4 is a schematic flowchart of another embodiment of a method for access control handover of a user between base stations. The following paragraphs provide details of this method.

401: A first base station sends an X2 interface establishment request message to a second base station, where the message carries a CSG ID and cell access mode information that are supported by the first base station.

402: The second base station sends an X2 interface establishment response message to the first base station, where the message carries a CSG ID and cell access mode information that are supported by the second base station.

The X2 interface establishment request message in steps 401 and 402 may also be an X2 interface modification message.

In steps 401 and 402, the second base station may also send the X2 interface establishment request message to the first base station, and the second base station may also send a handover establishment response message to the first base station.

403: The first base station compares whether the CSG ID supported by the first base station is the same as the CSG ID of the second base station. If the CSG IDs are the same, the first base station performs access control according to CSG membership information of a UE in the first base station and the cell access mode information of the second base station.

If the second base station is in a closed CSG mode and the CSG membership information of the UE in the first base station is that the UE belongs to the CSG cell, or if the second base station is in a hybrid CSG mode, the UE is handed over to the second base station through the access control.

If the second base station is in the closed CSG mode and the CSG membership information of the UE in the first base station is that the UE does not belong to the CSG cell, the UE fails in the access control, and the first base station does not hand over the UE to the second base station.

If the second base station is in the hybrid CSG mode, the first base station carries the CSG membership information of the UE in a handover request and sends the handover request to the second base station.

404: In step 403, if the access control is successful, the first base station sends a handover request message to the second base station. The request message carries CSG membership information supported by the first base station.

In step 404, if the CSG IDs are the same, the second base station does not perform the access control.

405: The second base station allocates resources to the UE according to the received CSG membership information, sends a handover acknowledgement message to the first base station if the resources are allowable, and performs step 406.

406: After the UE accesses the second base station successfully, the second base station sends a path handover request to an MME.

407: The MME returns a path handover acknowledgement message to the second base station.

In step 406, for a handover in the same HeNB GW, the HeNB GW may terminate the path handover message, and does not send a path handover request message to the MME again; in step 407, the HeNB GW returns the path handover acknowledgement message to the second base station.

In the embodiment of the present invention, the base stations establish a connection through the X2 interface and perform CSG membership information interaction, preventing a UE without access permission from being handed over to the CSG cell, and thereby ensuring a normal service of the UE in the CSG cell. For a CSG cell of a hybrid access mode, the first base station determines whether a UE belongs to the CSG cell by performing CSG message interaction with a neighboring base station through the X2 interface, so as to preferentially allocate resources to the UE belonging to the CSG cell, ensuring the power for the UE belonging to the CSG cell to preferentially use subscribed-to resources.

Figure 5A:
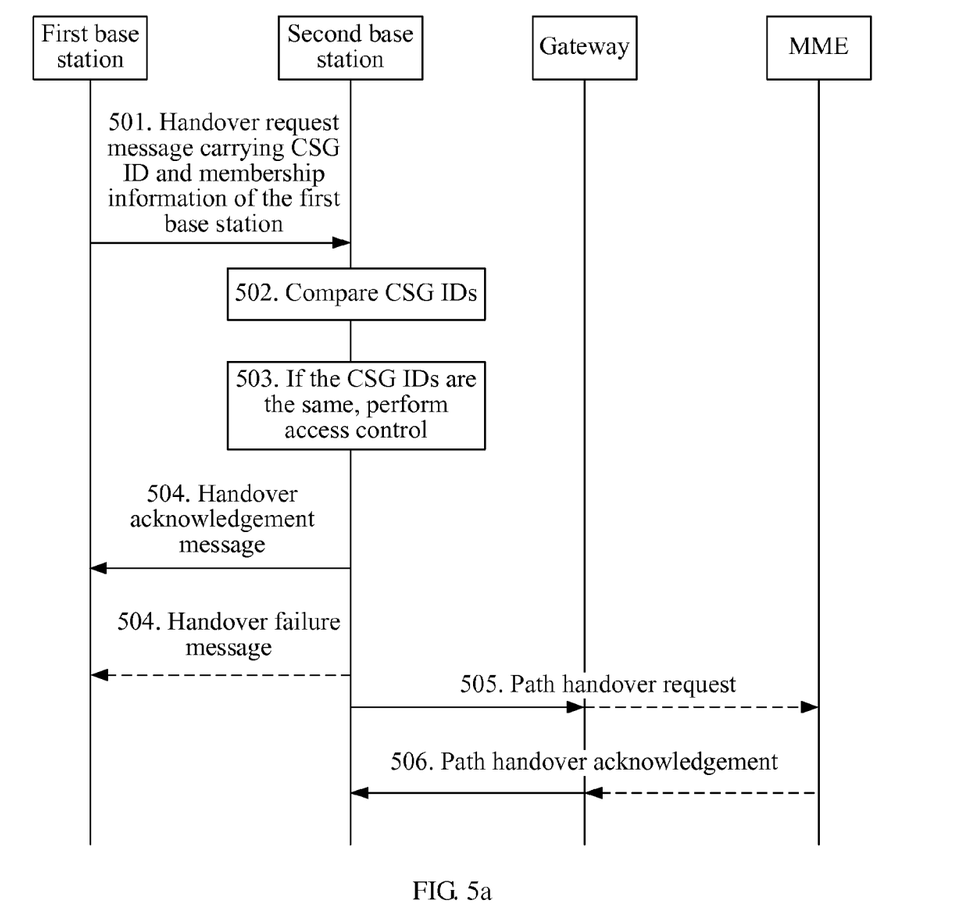
FIG. 5a is a schematic flowchart of another embodiment of a method for access control handover of a user between base stations.

FIG. 5a is a schematic flowchart of another embodiment of a method for access control handover of a user between base stations. The embodiment is similar to the embodiment shown in FIG. 3a. The difference lies in that, when the first base station and the second base station establish or modify the X2 interface, the first base station and the second base station do not perform interaction of CSG IDs supported respectively by the first base station and the second base station. The first base station sends a handover request message to the second base station through the X2 interface, where the message carries the CSG ID supported by the first base station and membership information of the user in the first base station.

Figure 5B:
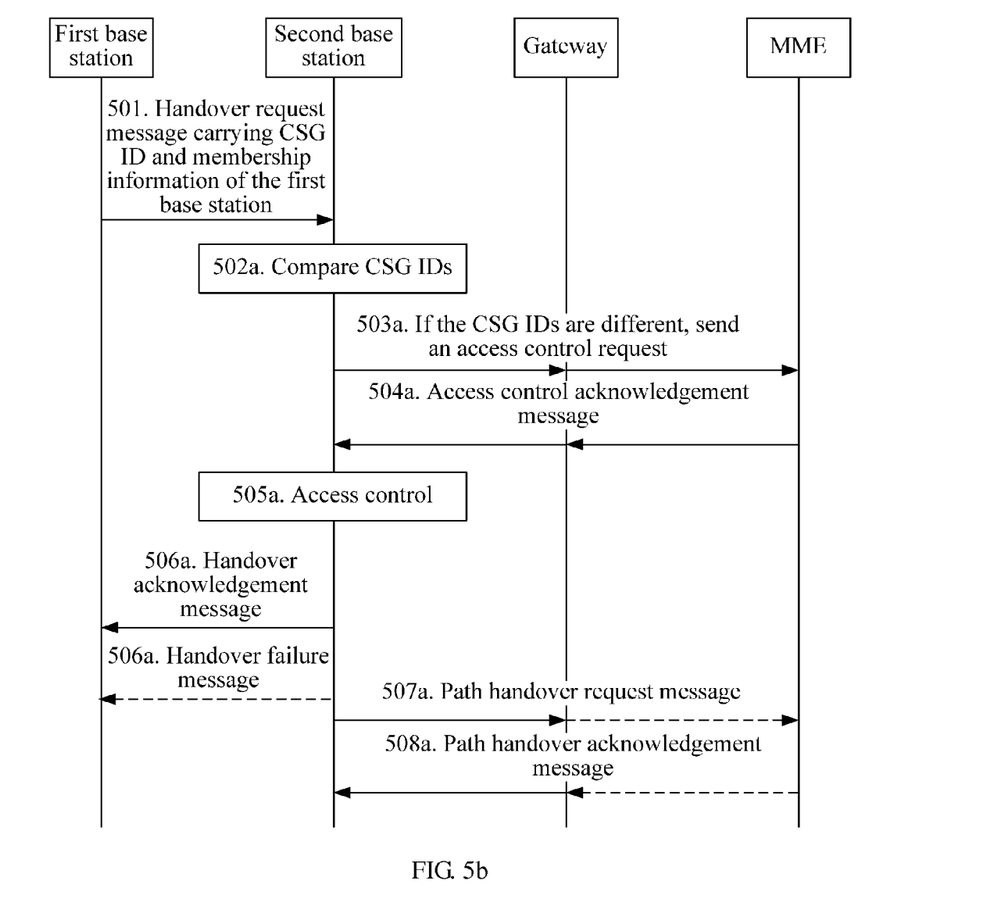
FIG. 5b is a schematic flowchart of another embodiment of a method for access control handover of a user between base stations.

FIG. 5b is a schematic flowchart of another embodiment of a method for access control handover of a user between base stations. The embodiment is similar to the embodiment shown in FIG. 3b. The difference lies in that, when the first base station and the second base station establish or modify the X2 interface, the first base station and the second base station do not perform interaction of the CSG IDs supported respectively by the first base station and the second base station. The first base station sends a handover request message to the second base station through the X2 interface, where the message carries the CSG ID supported by the first base station and membership information of the user in the first base station.

Figure 6:
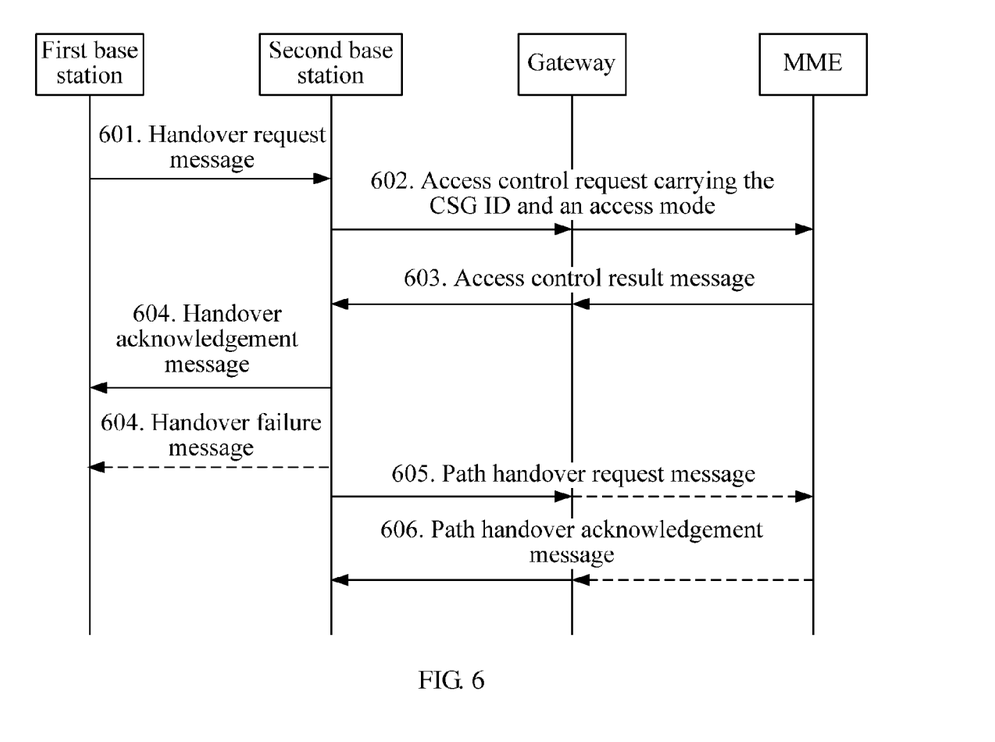
FIG. 6 is a schematic flowchart of another embodiment of a method for access control handover of a user between base stations.

FIG. 6 is a schematic flowchart of another embodiment of a method for access control handover of a user between base stations. When a first base station and a second base station establish or modify an X2 interface, the first base station and the second base station do not perform interaction of CSG IDs supported respectively by the first base station and the second base station. The following paragraphs provide details of this method.

601: The first base station sends a handover request message to the second base station through the X2 interface, where the handover request message does not carry the CSG ID supported by the first base station.

602: After receiving the handover request message, the second base station sends an access control request message to a mobility management entity (MME) through a HeNB GW, where the message carries the CSG ID supported by the second base station and an access mode of the second base station.

603: The MME sends an access control result message to the second base station through the HeNB GW, where the message may carry CSG membership information of the user in the second base station.

604: If the second base station receives an access control acknowledgement message sent by the MME, the second base station sends an access success message to the first base station and performs step 605. If the second base station receives an access control refusal message sent by the MME, the second base station sends an access failure message to the first base station, and the procedure ends.

605: After the user accesses the second base station successfully, the second base station sends a path handover request to the MME.

606: The MME returns a path handover acknowledgement message to the second base station.

In step 605, for a handover in the same HeNB GW, the HeNB GW may automatically terminate the path handover message, and does not forward a path handover request message to the MME again. In step 606, the HeNB GW returns the path handover acknowledgement message to the second base station.

In the embodiment of the present invention, the second base station sends the access control request message to the MME through the HeNB GW, where the message carries the CSG ID and the access mode of the second base station. If the second base station receives the access control acknowledgement message sent by the MME, the second base station sends the access success message to the first base station, preventing a UE without access permission from being handed over to the CSG cell, thereby ensuring a normal service of the UE in the CSG cell, and ensuring the power for the UE belonging to the CSG cell to preferentially use subscribed-to resources.

Figure 7:
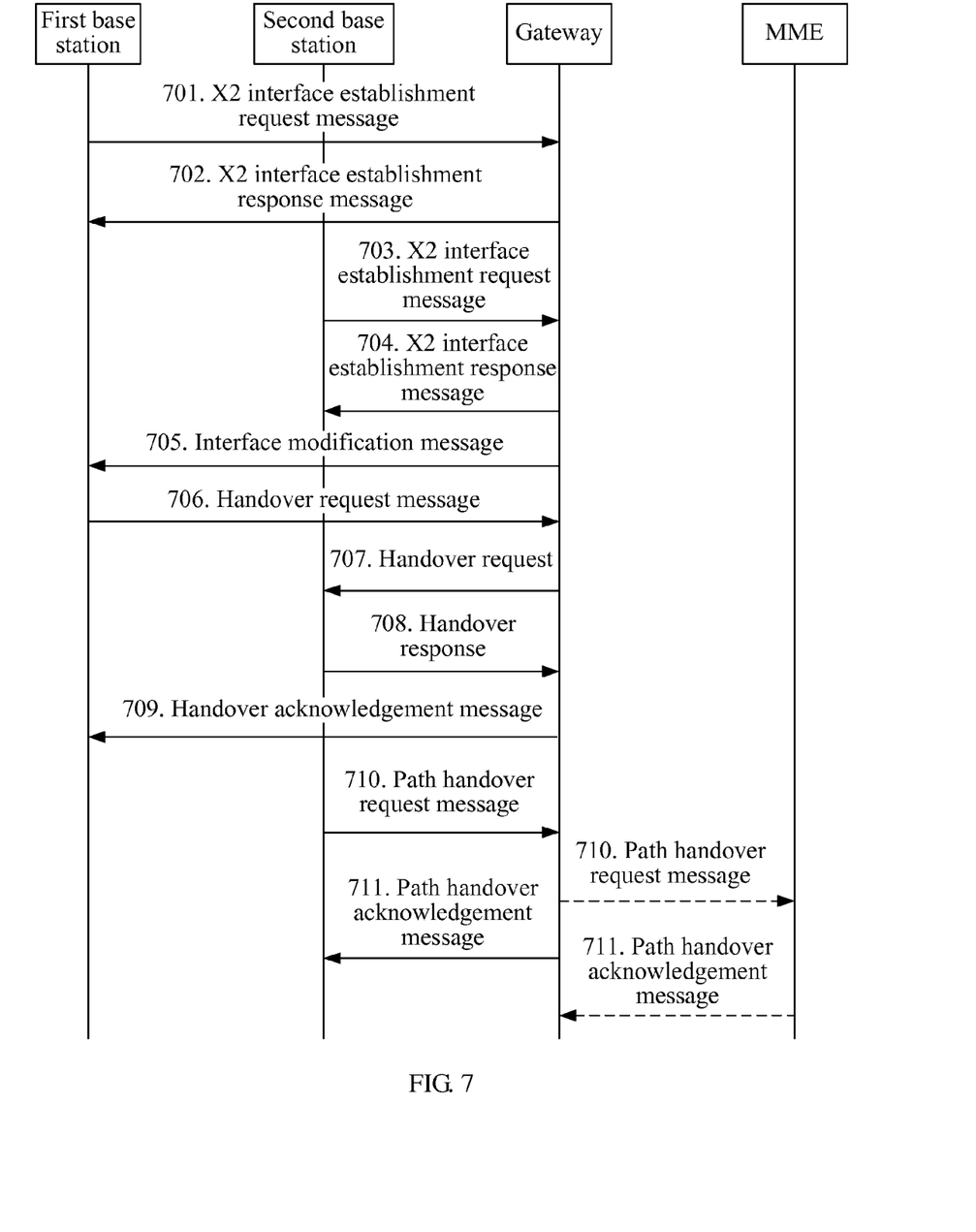
FIG. 7 is a schematic flowchart of an embodiment of a method for establishing a connection between base stations through an X2 proxy function entity.

FIG. 7 is a schematic flowchart of another method for handover of a user between base stations according to an embodiment of the present invention. No direct X2 interface exists between neighboring base stations and the base stations are connected through at least one X2 proxy function entity. The access control in this scenario is similar to the foregoing embodiments. The embodiment of the present invention is described by taking an example that two base stations establish a connection through an X2 proxy function entity HeNB GW and with reference to the embodiment shown in FIG. 3a. The embodiment includes the following.

701: A first base station sends an X2 interface establishment request message to the HeNB GW.

702: The HeNB GW sends an X2 interface establishment response message to the first base station, where the message carries information about an X2 interface already established by the X2 proxy function entity with another base station except the first base station.

703: A second base station sends the X2 interface establishment request message to the HeNB GW.

704: The HeNB GW sends the X2 interface establishment response message to the second base station, where the X2 interface establishment response message may include information about a base station having an X2 interface with the HeNB GW, and the base station information at least includes an X2 interface relationship among the first base station and another base station and the HeNB GW and a CSG ID that is supported by a cell.

In steps 701 to 704, the X2 interface establishment message may also be an X2 interface modification message.

705: The HeNB GW may send an X2 interface establishment modification message to the first base station, where the message carries information about a base station already establishing an X2 interface with the HeNB GW, and the base station information at least includes an interface relationship between the base station and the X2 proxy function entity and the CSG ID that is supported by the cell. The base station already establishing the X2 interface with the HeNB GW includes the second base station and the first base station.

706: The first base station sends a handover request message to the HeNB GW, where the request message carries a second base station identifier and CSG membership information of a UE in the first base station.

707: The HeNB GW forwards the handover request message to the second base station, where the request message carries the second base station identifier and the CSG membership information of the UE in the first base station.

Steps between step 707 and step 708 are similar to steps 304 and 305 in the embodiment shown in FIG. 3a. The second base station compares whether a CSG ID of the second base station is the same as a CSG ID of the first base station. Optionally, the first base station may also compare whether the CSG ID supported by the first base station is the same as the CSG ID of the second base station received in the X2 interface message. If the CSG IDs are the same, the handover request carries the membership information of the UE in the first base station. If the CSG IDs supported by the second base station and the first base station are the same, the second base station determines that the CSG membership information of the UE in the first base station acquired from the first base station is continuously valid, and the second base station performs access control according to the CSG membership information of the UE in the first base station and the access mode of the second base station. If the second base station is in a closed CSG mode and the CSG membership information of the UE in the first base station received by the second base station is that the UE belongs to the CSG cell, the handover request of the UE is accepted. If the second base station is in the closed CSG mode and the CSG membership information of the UE in the first base station received by the second base station is that the UE does not belong to the CSG cell, the handover request of the UE is refused. If the second base station is in a hybrid CSG mode, the second base station accepts the handover request of the UE and allocates resources to the UE according to the received CSG membership information.

708: The second base station sends a handover response message to the HeNB GW.

The handover response message is used to notify the UE of being capable of accessing the second base station.

709: The HeNB GW forwards the handover response message to the first base station.

710: After the UE accesses the second base station, the second base station sends a path handover request to an MME.

711: The MME returns a path handover acknowledgement message to the second base station.

In step 710, for a handover in the same HeNB GW, the HeNB GW may automatically terminate the path handover message. In step 711, the HeNB GW returns the path handover acknowledgement message to the second base station.

The embodiment shown in FIG. 7 only describes the scenario that no X2 interface exists between the neighboring base stations. The access control in the scenario is similar to the foregoing embodiments, and is not described in detail here again. In the embodiment shown in FIG. 7, the X2 proxy function entity may be a HeNB GW or a base station. The X2 proxy function entity may be a master base station or a common base station. The method is also applicable to a scenario that at least two base stations are connected through a plurality of X2 proxy function entities.

For a scenario that an X2 interface exists between neighboring base stations, the embodiment of the present invention is described only by taking an example of two neighboring base stations, but the present invention includes, but is not limited to, a handover between two neighboring base stations.

For a scenario that no X2 interface exists between neighboring base stations, the embodiment of the present invention is described by taking an example that a connection is established through an X2 proxy function entity, but the present invention includes, but is not limited to, establishing the connection through the X2 proxy function entity. The neighboring base stations also include, but are not limited to, a handover between two neighboring base stations.

Figure 8A:
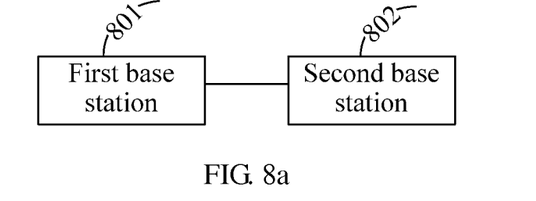
FIG. 8a is a schematic structure diagram of an embodiment of a communication system.

FIG. 8a is a schematic structure diagram of a communication system according to the present invention. The system includes a first base station 801 and a second base station 802. One of the first base station and the second base station acquires a closed subscriber group identifier CSG ID supported by the other base station and CSG membership information of a user equipment UE in the first base station. If the acquired CSG ID is the same as a CSG ID supported by the local base station, the one base station performs access control according to the acquired CSG membership information of the UE and an access mode of the other base station.

Figure 8B:
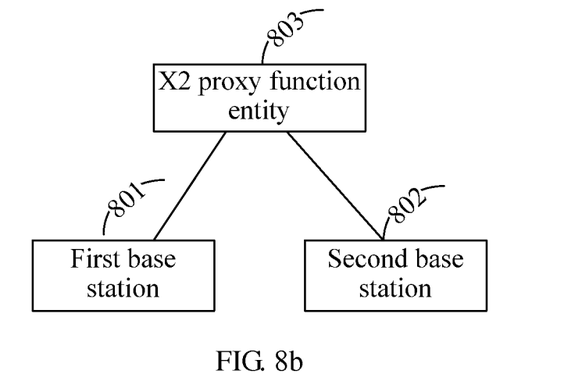
FIG. 8b is another schematic structure diagram of an embodiment of a communication system.

Further, as shown in FIG. 8b, the communication system further includes an X2 proxy function entity 803. The two base stations perform base station information interaction through the X2 proxy function entity before the one of the first base station and the second base station acquires the CSG ID supported by the other base station and the CSG membership information of the UE in the other base station, so that the two base stations communicate with each other through the X2 proxy function entity. The base station information at least includes an interface relationship between the base station and the X2 proxy function entity.

In the embodiment of the present invention, one of the first base station and the second base station acquires the closed subscriber group identifier CSG ID supported by the other base station and the CSG membership information of the user equipment UE in the first base station; and if the CSG ID acquired by the one base station is the same as the CSG ID supported by the local base station, the one base station performs the access control according to the acquired CSG membership information of the UE and the access mode of the other base station, preventing a UE without access permission from being handed over to a CSG cell, and thereby ensuring a normal service of the UE in the CSG cell. For a CSG cell of a hybrid access mode, the second base station determines whether a UE belongs to the CSG cell by performing CSG message interaction with a neighboring base station through an X2 interface, so as to preferentially allocate resources to the UE belonging to the CSG cell, ensuring the power for the UE belonging to the CSG cell to preferentially use subscribed-to resources. The embodiment of the present invention is applicable to not only a scenario that the X2 interface exists between two base stations, but also a scenario that an X1 interface exists between two base stations and a scenario that a link is established through an X2 proxy function entity.

Through the foregoing description of the embodiments, it may be clearly understood by persons skilled in the art that the present invention may be implemented by hardware on a necessary universal hardware platform, and definitely may also be implemented by hardware, but in most cases, the present invention is preferably implemented through the former method. Based on such understanding, the technical solution of the present invention or the part that makes contributions to the prior art may be essentially embodied in the form of a software product. The computer software product may be stored in a storage medium, including a number of instructions that cause a computer device (such as a personal computer, a server, or a network device) to perform the method according to the embodiments of the present invention.

Although the present invention has been shown and described with reference to some exemplary embodiments of the present invention, persons of ordinary skill in the art may understand that various changes in forms and details may be made to the present invention without departing from the spirit and scope of the present invention.

What is claimed is:

1. A method for allocating resources, the method comprising:

sending, by a second base station, an X2 interface establishment request message to a first base station, wherein the X2 interface establishment request message carries a closed subscriber group identifier (CSG ID) supported by the second base station, so that the first base station determines, according to whether a CSG ID supported by the first base station is the same as the CSG ID supported by the second base station, whether it is allowed to initiate a procedure of handing over a user equipment (UE) from the first base station to the second base station; and if the first base station initiates the procedure of handing over the UE from the first base station to the second base station, receiving, by the second base station, CSG membership information of the UE in the first base station sent by the first base station, and allocating the resources to the UE according to the CSG membership information of the UE in the first base station.

2. The method according to claim 1, wherein receiving the CSG membership information comprises receiving a handover request message sent by the first base station, wherein the handover request message carries the CSG membership information of the UE in the first base station.

3. A computer program product, comprising computer program code, which, when executed by a computer unit, will cause the computer unit to perform the steps of a base station according to claim 1.

4. A method for allocating resources, the method comprising
receiving, by a first base station, an X2 interface establishment request message sending by a second base station, wherein the X2 interface establishment request message carries a closed subscriber group identifier (CSG ID) supported by the second base station;
determining, by the first base station and according to whether a CSG ID supported by the first base station is the same as the CSG ID supported by the second base station, whether the first base station is allowed to initiate a procedure of handing over a user equipment (UE) from the first base station to the second base station; and
if the first base station determines that it is allowed to initiate the procedure of handing over the UE from the first base station to the second base station, sending, by the first base station, CSG membership information of the UE in the first base station, so that the second base station can allocate the resources to the UE according to the CSG membership information of the UE in the first base station.

5. An apparatus for allocating resources, the apparatus comprising:
a unit, configured to send an X2 interface establishment request message to a first base station, wherein the X2 interface establishment request message carries a closed subscriber group (CSG) identifier (ID) supported by a second base station;
a unit, configured to, if the first base station initiates a procedure of handing over a user equipment (UE) from the first base station to the local base station, receive CSG membership information of the UE in the first base station sent by the first base station; and
a unit, configured to allocate the resources to the UE according to the CSG membership information of the UE in the first base station.

6. The apparatus according to claim 5, wherein the unit configured to receive the CSG membership information of the UE in the first base station sent by the first base station is specifically configured to receive a handover request message sent by the first base station, wherein the handover request message carries the CSG membership information of the UE in the first base station.

7. An apparatus for allocating resources, the apparatus comprising:
a unit, configured to receive an X2 interface establishment request message sent by a second base station, wherein the X2 interface establishment request message carries a closed subscriber group (CSG) identifier (ID) supported by a second base station;
a unit, configured to determine, according to whether a CSG ID supported by a local base station is the same as the CSG ID supported by the second base station, whether it is allowed to initiate a procedure of handing over a user equipment (UE) from a local base station to the second base station; and
a unit, configured for the local base station to send CSG membership information of the UE in the local base station if the procedure of handing over the UE from the local base station to the second base station is determined to be initiated, so that the second base station allocates the resources to the UE according to the CSG membership information of the UE in the local base station.

8. The apparatus according to claim 7, wherein the unit configured to send the CSG membership information of the UE in the local base station is specifically configured to send a handover request message carrying the CSG membership information of the UE in the local base station.

9. A method for allocating resources, the method comprising:
sending, by a second base station, an X2 interface establishment response message to a first base station, wherein the X2 interface establishment response message carries a closed subscriber group identifier (CSG ID) supported by the second base station;
if the first base station initiates the procedure of handing over the UE from the first base station to the second base station, receiving, by the second base station, CSG membership information of the UE in the first base station sent by the first base station, and allocating the resources to the UE according to the CSG membership information of the UE in the first base station.

10. The method according to claim 9, wherein before sending the X2 interface establishment response message, the method further comprises:
receiving, by the second base station, an X2 interface establishment request message sent by the first base station, wherein the X2 interface establishment request message carries the CSG ID supported by the first base station, so that the second base station is able to determine, according to whether the CSG ID supported by the second base station is the same as the CSG ID supported by the first base station, whether it is allowed to initiate a procedure of handing over the UE from the second base station to the first base station.

11. The method according to claim 9, wherein receiving the CSG membership information comprises receiving a handover request message sent by the first base station, wherein the handover request message carries the CSG membership information of the UE in the first base station.

12. A method for allocating resources, the method comprising:
receiving, by a first base station, an X2 interface establishment response message sending by a second base station, wherein the X2 interface establishment response message carries a closed subscriber group identifier (CSG ID) supported by the second base station;
determining, by the first base station and according to whether a CSG ID supported by the first base station is the same as the CSG ID supported by the second base station, whether the first base station is allowed to initiate a procedure of handing over a user equipment (UE) from the first base station to the second base station; and
if the first base station determines that it is allowed to initiate the procedure of handing over the UE from the first base station to the second base station, sending, by the first base station, CSG membership information of the UE in the first base station, so that the second base station can allocate the resources to the UE according to the CSG membership information of the UE in the first base station.

13. The method according to claim 12, wherein before receiving the X2 interface establishment response message, the method further comprises sending, by the first base station, a handover request message to the second base station, wherein the handover request message carries the CSG membership information of the UE in the first base station.

14. An apparatus for allocating resources, the apparatus comprising:
a unit, configured to send an X2 interface establishment response message to a first base station, wherein the X2 interface establishment response message carries a closed subscriber group identifier (CSG ID) supported by a second base station;
a unit, configured to, if the first base station initiates a procedure of handing over a user equipment (UE) from the first base station to the local base station, receive CSG membership information of the UE in the first base station sent by the first base station; and a unit, configured to allocate the resources to the UE according to the CSG membership information of the UE in the first base station.

15. The apparatus according to claim 14, wherein:

the unit configured to receive the CSG membership information of the UE in the first base station sent by the first base station is further configured to receive an X2 interface establishment request message sent by the first base station, wherein the X2 interface establishment request message carries a CSG ID supported by the first base station; and the apparatus further comprises a unit, configured to determine, according to whether the CSG ID supported by the local base station is the same as the CSG ID supported by the first base station, whether it is allowed to initiate a procedure of handing over the UE from the local base station to the first base station.

16. The apparatus according to claim 14, wherein the unit configured to receive the CSG membership information of the UE in the first base station sent by the first base station is specifically configured to receive a handover request message sent by the first base station, wherein the handover request message carries the CSG membership information of the UE in the first base station.

17. An apparatus for allocating resources, the apparatus comprising:

a unit, configured to receive an X2 interface establishment response message sent by a second base station, wherein the X2 interface establishment response message carries a closed subscriber group identifier (CSG ID) supported by a second base station;

a unit, configured to determine, according to whether a CSG ID supported by the local base station is the same as the CSG ID supported by the second base station, whether it is allowed to initiate a procedure of handing over a user equipment (UE) from a local base station to the second base station; and a unit, configured for the local base station to send CSG membership information of the UE in the local base station if the procedure of handing over the UE from the local base station to the second base station is determined to be initiated, so that the second base station allocates the resources to the UE according to the CSG membership information of the UE in the local base station.

18. The apparatus according to claim 17, the apparatus further comprising:

a unit, configured to determine, according to whether the CSG ID supported by the local base station is the same as the CSG ID supported by the second base station, whether it is allowed to initiate a procedure of handing over the UE from the second base station to the local base station.

19. The apparatus according to claim 17, wherein the unit configured to send the CSG membership information of the UE in the local base station is specifically configured to receive a handover request message carrying the CSG membership information of the UE in the local base station.

* * * * *